(12) United States Patent
Nam et al.

(10) Patent No.: US 11,831,716 B2
(45) Date of Patent: Nov. 28, 2023

(54) SYSTEM AND METHOD FOR COMMUNICATION BETWEEN BMSS

(71) Applicant: LG CHEM, LTD., Seoul (KR)

(72) Inventors: Ho-Chol Nam, Daejeon (KR); Moon-Gyu Choi, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 479 days.

(21) Appl. No.: 16/763,075

(22) PCT Filed: Sep. 25, 2019

(86) PCT No.: PCT/KR2019/012464
§ 371 (c)(1),
(2) Date: May 11, 2020

(87) PCT Pub. No.: WO2020/071682
PCT Pub. Date: Apr. 9, 2020

(65) Prior Publication Data
US 2020/0351349 A1  Nov. 5, 2020

(30) Foreign Application Priority Data

Oct. 4, 2018  (KR) .................. 10-2018-0118520

(51) Int. Cl.
*H04L 67/12* (2022.01)
*H01M 10/42* (2006.01)
(Continued)

(52) U.S. Cl.
CPC .......... *H04L 67/12* (2013.01); *H01M 10/425* (2013.01); *H04L 43/0894* (2013.01);
(Continued)

(58) Field of Classification Search
None
See application file for complete search history.

(56) References Cited

U.S. PATENT DOCUMENTS 10,131,246 B2* 11/2018 Demont ................. B60L 58/22
10,367,677 B2*  7/2019 Parkvall ............ H04W 52/0229
(Continued)

FOREIGN PATENT DOCUMENTS

CN  101051221 A  10/2007
CN  101322341 A  12/2008
(Continued)

OTHER PUBLICATIONS

International Search Report issued in PCT/KR2019/012464 (PCT/ISA/210), dated Jan. 2, 2020.
(Continued)

*Primary Examiner* — Henry Tsai
*Assistant Examiner* — Christopher A Bartels
(74) *Attorney, Agent, or Firm* — Birch, Stewart, Kolasch & Birch, LLP

(57) ABSTRACT

A system for communication between BMSs of a battery pack including a plurality of BMSs connected to a parallel communication network, and a plurality of slave BMSs allocated with different communication identifiers, each having a variable field; and a master BMS for allocating a communication identifier to each of the plurality of slave BMSs through the parallel communication network, changing a priority determination value allocated to the variable field according to a predetermined condition, and performing communication with the plurality of slave BMSs based on the communication identifier.

20 Claims, 4 Drawing Sheets

(51) Int. Cl.
*H04L 61/00* (2022.01)
*H04L 47/24* (2022.01)
*H04L 43/0894* (2022.01)
*H04Q 9/00* (2006.01)

(52) U.S. Cl.
CPC .......... *H04L 47/2458* (2013.01); *H04L 61/00* (2013.01); *H04Q 9/00* (2013.01); *H01M 2010/4271* (2013.01); *H01M 2010/4278* (2013.01); *H01M 2220/20* (2013.01); *H04Q 2209/30* (2013.01)

(56) References Cited

U.S. PATENT DOCUMENTS

| | | | |
|---|---|---|---|
| 10,506,506 B2 * | 12/2019 | Qiao | .................... H04W 48/18 |
| 2004/0125815 A1 | 7/2004 | Shimazu et al. | |
| 2006/0036435 A1 * | 2/2006 | Kovesi | .................. G10L 19/002 704/229 |
| 2007/0121524 A1 | 5/2007 | Rangarajan et al. | |
| 2009/0092055 A1 * | 4/2009 | Balasubramanian | ... H04W 8/04 370/252 |
| 2010/0158013 A1 * | 6/2010 | Kliger | ..................... H04L 47/70 370/393 |
| 2010/0190505 A1 * | 7/2010 | Shiizaki | ............ H04W 52/0261 455/574 |
| 2013/0110637 A1 * | 5/2013 | Bott | .................... G06Q 30/0244 705/14.64 |
| 2013/0253715 A1 * | 9/2013 | Cho | ......................... H04Q 9/00 700/286 |
| 2014/0056235 A1 * | 2/2014 | Liu | ....................... H04W 76/22 370/329 |
| 2014/0091769 A1 | 4/2014 | Kim et al. | |
| 2015/0006666 A1 * | 1/2015 | Backholm | ............... H04W 4/18 709/213 |
| 2015/0084598 A1 | 3/2015 | Song | |
| 2015/0372897 A1 * | 12/2015 | Han | ........................ H04L 45/26 370/254 |
| 2016/0226268 A1 | 8/2016 | Okui | |
| 2016/0291683 A1 | 10/2016 | Kacker et al. | |
| 2016/0359329 A1 * | 12/2016 | Kim | ..................... H01M 10/425 |
| 2017/0331577 A1 * | 11/2017 | Parkvall | .............. H04J 11/0079 |
| 2017/0353929 A1 * | 12/2017 | Tacconi | ................ H04W 52/42 |
| 2018/0149704 A1 | 5/2018 | Yoon et al. | |
| 2018/0186241 A1 * | 7/2018 | Harvey | ................... B60L 53/14 |
| 2019/0126774 A1 * | 5/2019 | Demont | ................ H01M 10/425 |
| 2019/0260097 A1 * | 8/2019 | Kwon | ................ H01M 10/425 |
| 2020/0229206 A1 * | 7/2020 | Badic | .................... H04W 16/32 |
| 2021/0168077 A1 * | 6/2021 | Hu | ........................ H04W 40/22 |
| 2021/0309121 A1 * | 10/2021 | Jain | ...................... B60L 53/305 |
| 2021/0313626 A1 * | 10/2021 | Deng | .................. G01R 31/382 |
| 2022/0046114 A1 * | 2/2022 | Entelis | .................. H04L 12/40 |
| 2022/0052872 A1 * | 2/2022 | Hofer | ................. H01M 10/486 |
| 2023/0051999 A1 * | 2/2023 | Noller | .................. H02J 7/0013 |

FOREIGN PATENT DOCUMENTS

| | | |
|---|---|---|
| CN | 101640951 A | 2/2010 |
| CN | 103522994 A | 1/2014 |
| CN | 103650290 A | 3/2014 |
| CN | 108297723 A | 7/2018 |
| EP | 3 090 905 A1 | 11/2016 |
| JP | 2001-350639 A | 12/2001 |
| JP | 2012-181131 A | 9/2012 |
| JP | 2015-177234 A | 10/2015 |
| KR | 10-2013-0058373 A | 6/2013 |
| KR | 10-2014-0078323 A | 6/2014 |
| KR | 10-1458436 B1 | 11/2014 |
| KR | 10-2015-0033188 A | 4/2015 |
| KR | 10-1837840 B1 | 4/2018 |
| KR | 10-2018-0079769 A | 7/2018 |

OTHER PUBLICATIONS

Extended Search Report dated Mar. 3, 2021 in corresponding EP Patent Application No. 19869805.2.

* cited by examiner

SYSTEM AND METHOD FOR COMMUNICATION BETWEEN BMSS

TECHNICAL FIELD

The present application claims priority to Korean Patent Application No. 10-2018-0118520 filed on Oct. 4, 2018 in the Republic of Korea, the disclosures of which are incorporated herein by reference.

The present disclosure relates to a system and method for communication between BMSs, and more particularly, to a system and method for communication between BMSs, which may reduce a communication response delay between a master BMS and a plurality of slave BMSs provided to a battery pack.

BACKGROUND ART

In recent years, the demand for portable electronic products such as notebook computers, video cameras and portable phones has increased sharply, and the electric vehicles, energy storage batteries, robots and satellites has been active developed.

Accordingly, high-performance secondary batteries allowing repeated charging and discharging are being actively studied.

Secondary batteries commercially available at present include nickel-cadmium batteries, nickel-hydrogen batteries, nickel-zinc batteries, lithium secondary batteries and the like. Among them, the lithium secondary batteries have almost no memory effect compared to nickel-based secondary batteries and thus are in the limelight due to advantageous of free charging and discharging, low self-discharge rate and high energy density.

Batteries are used in a wide variety of applications, and large capacities are often required for devices such as electric-driven vehicles or smart grid systems to which batteries are frequently utilized. In order to increase the capacity of the battery, the capacity of the secondary battery, namely the capacity of a battery cell itself, may be increased. However, in this case, the capacity increase effect is not large and there is a physical limitation on the size expansion of the secondary battery. Thus, generally, a battery pack in which a plurality of battery modules are connected in series and in parallel is widely used.

Meanwhile, as the need for a large capacity structure of a battery pack increases, recently, a demand for a battery pack having a multi-module structure in which a plurality of battery modules, in each of which includes a plurality of batteries connected in series and/or in parallel, are aggregated is increasing.

Since the battery pack having the multi-module structure includes a plurality of batteries, there is a limit to control the charge/discharge states of all the batteries using a single BMS. Thus, recently, a BMS is installed in each battery module included in the battery pack, so that one of the BMSs is designated as a master BMS and the remaining BMSs are designated as slave BMSs. Then, the charge and discharge of each battery module is controlled by the master-slave method.

In the master-slave method, the master BMS communicates with the slave BMSs in order to collectively manage the charge and discharge of the battery modules included in the battery pack. Here, the master BMS collects various charge/discharge monitor data regarding the battery modules managed by the slave BMSs or transmits a control command for controlling the charging/discharging operation of each battery module to the corresponding slave BMS.

As such, in order to collect data or transmit a control commands through a communication network, a communication identifier ID for the master BMS to uniquely identify each slave BMS must be allocated to each slave BMS.

The communication identifier has a priority to distinguish each slave BMS. In general, the communication identifier has a higher priority as the size of the communication identifier is smaller.

However, if two or more slave BMSs transmit data to the master BMS at the same time, the data of the slave BMS with a low priority may be lost by the slave BMS with a high priority. In addition, when such a state accumulates, a communication response between the master BMS and the slave BMS with a low priority may be delayed.

DISCLOSURE

Technical Problem

The present disclosure is designed to solve the problems of the related art, and therefore the present disclosure is directed to providing an improved system and method for communication between BMSs, which may reduce a communication response delay between a master BMS and a plurality of slave BMSs provided to a battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A system for communication between BMSs according to an embodiment of the present disclosure is a system for communication between BMSs of a battery pack that includes a plurality of BMSs connected to a parallel communication network, the system comprising: a plurality of slave BMSs allocated with different communication identifiers, each having a variable field; and a master BMS configured to allocate a communication identifier to each of the plurality of slave BMSs through the parallel communication network, change a priority determination value allocated to the variable field of each slave BMS according to a predetermined condition, and perform communication with the plurality of slave BMSs based on the communication identifier.

In addition, the master BMS may be configured to calculate a data reception rate corresponding to each slave BMS based on a total amount of data received from the plurality of slave BMSs and an amount of data received from each slave BMS.

In addition, the master BMS may be configured to change the priority determination value allocated to the variable field of each slave BMS based on the calculated data reception rate.

In addition, the master BMS may be configured to calculate an average value of the data reception rates of the plurality of slave BMSs and change the priority determination value of one or more slave BMSs among the plurality of slave BMS whose data reception rate is smaller than the average value, based on the average value.

In addition, the master BMS may be configured to change the priority determination value so that the priority determination value is decreased as the data reception rate is smaller.

In addition, the master BMS may be configured to calculate an average value of the data reception rates of the plurality of slave BMSs and change the priority determination value of one or more slave BMSs among the plurality of slave BMS whose data reception rate is greater than the average value, based on the average value.

In addition, the master BMS may be configured to change the priority determination value so that the priority determination value is increased as the data reception rate is greater.

In addition, the master BMS may be configured to allocate the communication identifier to each of the plurality of slave BMSs so that the variable field is disposed at a foremost region of the communication identifier.

In addition, the master BMS may be configured to determine a communication priority of each of the plurality of slave BMSs based on the communication identifier and communicate with each slave BMS according to the determined communication priority. In addition, a battery pack according to an embodiment of the present disclosure comprises the system for communication between BMSs according to the present disclosure.

In addition, a vehicle according to an embodiment of the present disclosure comprises the system for communication between BMSs according to the present disclosure.

In addition, a method for communication between BMSs according to an embodiment of the present disclosure is a method for communication between BMSs of a battery pack that includes a plurality of BMSs connected to a parallel communication network, the method comprising: allocating a communication identifier having a variable field to each of a plurality of slave BMSs through the parallel communication network; changing a priority determination value allocated to the variable field of each slave BMS according to a predetermined condition; and allowing the plurality of slave BMSs and a master BMS to communication with each other based on the communication identifier.

Advantageous Effects

According to an aspect of the present disclosure, it is possible to effectively manage the data reception rate by changing the priority determination value of the slave BMS based on the data reception rate.

According to another aspect of the present disclosure, there is an advantage in that communication may be performed without a communication response delay with the same weight for the plurality of slave BMSs.

According to still another aspect of the present disclosure, it is possible to prevent data from being suddenly lost for a specific slave BMS by maintaining the data reception rate uniformly.

According to still another aspect of the present disclosure, by placing a variable field in the communication identifier, it is easy to change the order of the communication priorities.

The present disclosure may have various effects other than the above, and other effects of the present disclosure may be understood from the following description and more clearly figured out by the embodiments of the present disclosure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
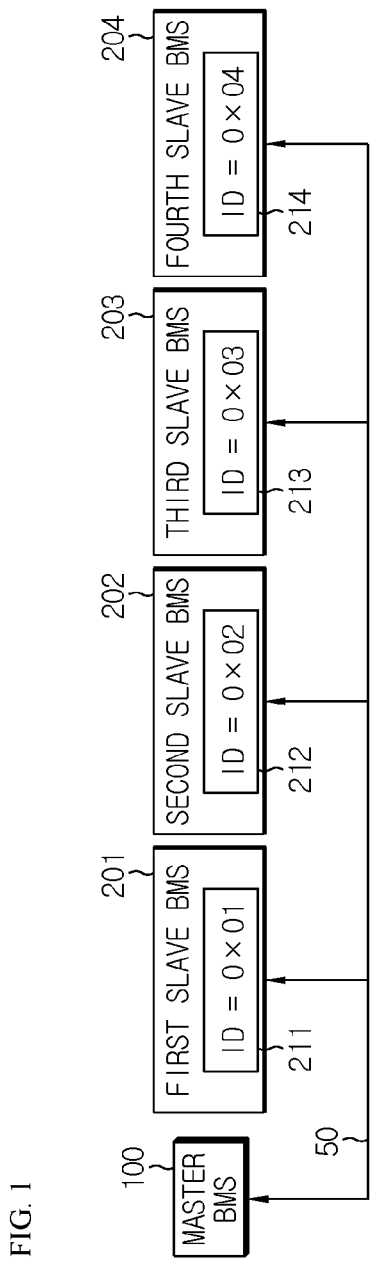
FIG. 1 is a diagram schematically showing a system for communication between BMSs according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in the present disclosure, if it is determined that a detailed description of a related known structure or function may obscure the subject matter of the present disclosure, the detailed description will be omitted.

Throughout the specification, when a portion is referred to as "comprising" or "including" any element, it means that the portion may include other elements further, without excluding other elements, unless specifically stated otherwise. Furthermore, the term "processor" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

In the specification, a secondary battery means one independent cell that has a cathode terminal and an anode terminal and is physically separable. For example, one pouch-type lithium polymer cell may be considered as a secondary battery.

A system for communication between BMSs according to an embodiment of the present disclosure may be a system for communication system between a plurality of BMSs connected to a parallel communication network 50, which is provided to a battery pack. More specifically, the system for communication between BMSs according to an embodiment of the present disclosure may be a system for communication between BMSs, which may reduce a communication response delay between a master BMS 100 and a plurality of slave BMSs 201, 202, 203, 204 provided to the battery pack.

For example, the plurality of BMSs provided in the system for communication between BMSs according to an embodiment of the present disclosure may be BMSs (Battery Management Systems) to which an algorithm for communication between the master BMS 100 and the slave BMSs 201, 202, 203, 204 according to the present disclosure is applied. In addition, each of the plurality of BMS may control at least one secondary battery in charge thereof. The control functions of the plurality of BMSs may include charge/discharge control of a secondary battery, equalization control, switching, measurement and monitoring of electrical characteristic values, fault indication, on/off control, and state of charge (SOC) measurement, and the like.

The master BMS 100 and the plurality of slave BMSs 201, 202, 203, 204 may be, as shown in FIG. 1, electrically connected through the parallel communication network 50 to send and receive electrical signals. In addition, the parallel communication network 50 connecting the master BMS 100 and the plurality of slave BMSs 201, 202, 203, 204, respectively, may be used for the plurality of slave BMSs 201, 202, 203, 204 to send and receive information for receiving a communication identifier from the master BMS 100. Preferably, the parallel communication network 50 may be a controller area network (CAN) communication network.

Preferably, the master BMS 100 and the plurality of slave BMSs 201, 202, 203, and 204 according to an embodiment of the present disclosure may include a processor and a memory device, respectively.

The processor may perform each operation of the system for communication between BMSs according to an embodiment of the present disclosure. In addition, the memory device may store information necessary for the operation of the system for communication between BMSs according to an embodiment of the present disclosure in advance. For example, the memory device may store a communication identifier.

Meanwhile, the processor may be implemented to include a processor, an application-specific integrated circuit (ASIC), another chipset, a logic circuit, a register, a communication modem, and/or a data processing device, selectively.

Meanwhile, the memory device is not particularly limited as long as it serves as a storage medium capable of recording and erasing data. For example, the memory device may be RAM, ROM, a register, a hard disk, an optical recording medium, or a magnetic recording medium. The memory device may also be electrically connected to the processor, for example, via a data bus or the like so as to be accessed by the processor.

The memory device may also store and/or update and/or erase and/or transmit data generated when a program including various control logics performed in the processor and/or a control logic is executed.

Figure 2:
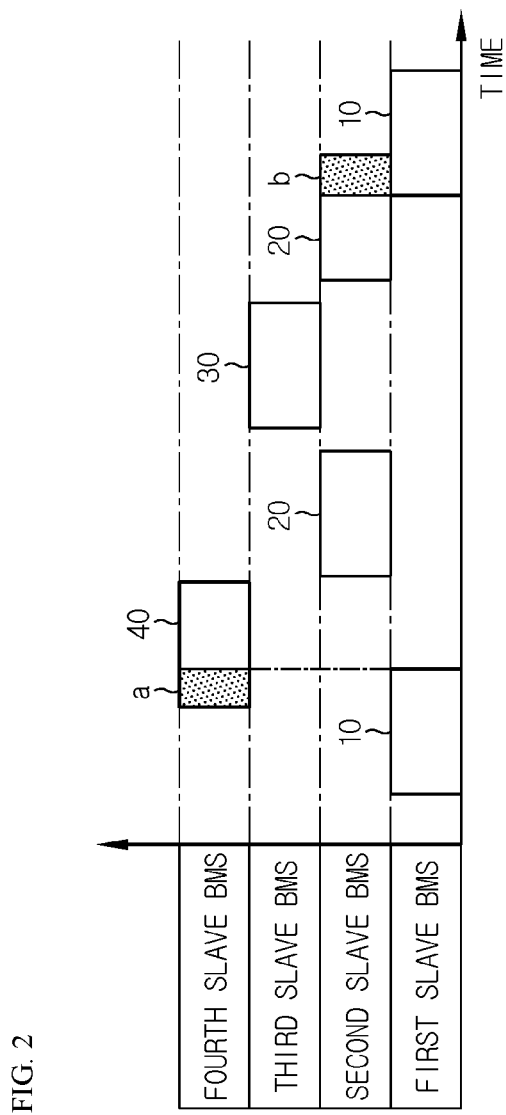
FIG. 2 is a diagram showing an example of data sent from each slave BMS, which is received by a master BMS, in the system for communication between BMSs according to an embodiment of the present disclosure.

FIG. 1 is a diagram schematically showing a system for communication between BMSs according to an embodiment of the present disclosure, and FIG. 2 is a diagram showing an example of data sent from each slave BMS, which is received by a master BMS, in the system for communication between BMSs according to an embodiment of the present disclosure. Also, FIG. 3 is a diagram schematically showing a system for communication between BMSs according to another embodiment of the present disclosure.

Figure 3:
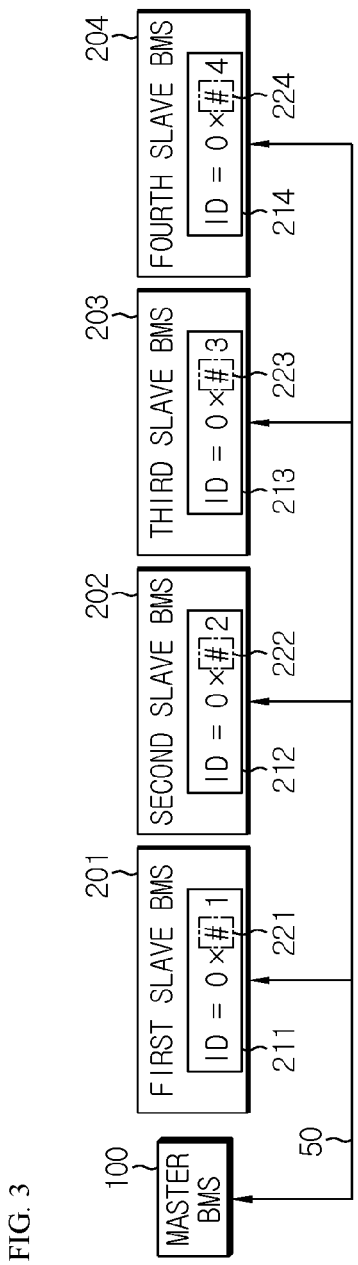
FIG. 3 is a diagram schematically showing a system for communication between BMSs according to another embodiment of the present disclosure.

Referring to FIGS. 1 to 3, the system for communication between BMSs according to an embodiment of the present disclosure includes a plurality of slave BMSs 201, 202, 203, 204 and a master BMS 100.

The plurality of slave BMSs 201, 202, 203, 204 may be allocated with different communication identifiers, each having a variable field. For example, the communication identifier may be an identifier ID for the master BMS 100 to recognize each slave BMS 201, 202, 203, 204 so that the master BMS 100 communicates with each slave BMS 201, 202, 203, 204. In addition, different identifiers ID may be allocated to different slave BMSs 201, 202, 203, 204 as the communication identifiers. Also, the communication identifier may be a code implemented in a coding language including a plurality of letters or numbers.

For example, as shown in FIG. 1, a first communication identifier 211 may be an identifier ID allocated to the first slave BMS 201 and used for communication between the master BMS 100 and the first slave BMS 201. For example, the first communication identifier 211 may be 0x01. In addition, a second communication identifier 212 may be an identifier ID allocated to the second slave BMS 202 and used for communication between the master BMS 100 and the second slave BMS 202. For example, the second communication identifier 212 may be 0x02. In addition, a third communication identifier 213 may be an identifier ID allocated to the third slave BMS 203 and used for communication between the master BMS 100 and the third slave BMS 203. For example, the third communication identifier 213 may be 0x03. In addition, a fourth communication identifier 214 may be an identifier ID allocated to the fourth slave BMS 204 and used for communication between the master BMS 100 and the fourth slave BMS 204. For example, the fourth communication identifier 214 may be 0x04.

In addition, the variable field may be a region included in the communication identifier. More specifically, the variable field may be a region included in a portion of the communication identifier so that a coding language having at least one letter or number is provided therein.

For example, as shown in FIG. 3, a first variable field 221 may be a region set before 1 of the first communication identifier 211. In addition, a second variable field 222 may be a region set before 2 of the second communication identifier 212. Also, a third variable field 223 may be a region set before 3 of the third communication identifier 213. In addition, a fourth variable field 224 may be a region set before 4 of the fourth communication identifier 214.

The master BMS 100 may allocate a communication identifier to each of the plurality of slave BMSs 201, 202, 203, 204 through the parallel communication network 50. For example, the master BMS 100 may allocate the communication identifier according to a predetermined condition to each slave BMS 201, 202, 203, 204. For example, as shown in FIG. 1, the master BMS 100 may sequentially allocate communication identifiers to the slave BMSs 201, 202, 203, 204 according to the connection order of the slave BMSs 201, 202, 203, 204.

In addition, the master BMS 100 may change a priority determination value allocated to the variable field according to a predetermined condition. For example, as shown in FIG. 3, the priority determination value may be allocated to the variable field. For example, the priority determination value may be a coding language including at least one letter or number. For example, the priority determination value may be 0 or 1. For example, the master BMS 100 may change the priority determination value for at least one slave BMS 201, 202, 203, 204. More specifically, the master BMS 100 may change the priority determination value for at least one slave BMS 201, 202, 203, 204 and allocate the changed priority determination value to at least one slave BMS 201, 202, 203, 204, respectively.

In addition, the master BMS 100 may communicate with the plurality of slave BMSs 201, 202, 203, 204 based on the communication identifiers. For example, the master BMS 100 may identify each slave BMS 201, 202, 203, 204 through the communication identifier and communicate between the master BMS 100 and each slave BMS 201, 202, 203, 204 based on the communication identifier.

For example, as shown in FIG. 1, the master BMS 100 may identify the first slave BMS 201 based on the first communication identifier 211 having the value of 0x01 and communicate with the first slave BMS 201 based on the first communication identifier 211. In addition, the master BMS 100 may identify the second slave BMS 202 based on the second communication identifier 212 having the value of 0x02 and communicate with the second slave BMS 202 based on the second communication identifier 212. Also, the master BMS 100 may identify the third slave BMS 203 based on the third communication identifier 213 having the value of 0x03 and communicate with the third slave BMS 203 based on the third communication identifier 213. In addition, the master BMS 100 may identify the fourth slave BMS 204 based on the fourth communication identifier 214 having the value of 0x04 and communicate with the fourth slave BMS 204 based on the fourth communication identifier 214.

Preferably, the master BMS 100 according to an embodiment of the present disclosure may calculate a data reception rate corresponding to each slave BMS 201, 202, 203, 204. More specifically, the master BMS 100 may calculate the data reception rate corresponding to each slave BMS 201, 202, 203, 204 based on a total amount of data received from the plurality of slave BMSs 201, 202, 203, 204 and an amount of data received from each slave BMS 201, 202, 203, 204.

For example, as shown in FIGS. 1 and 2, the master BMS 100 may communicate with each slave BMS 201, 202, 203, 204 based on the communication identifier and calculate the data reception rate corresponding to each slave BMS 201, 202, 203, 204. For example, referring to the embodiment of FIG. 2, the master BMS 100 may receive data sent from each slave BMS 201, 202, 203, 204. More specifically, the master BMS 100 may calculate the total data amount by summing all of a data amount of first data 10 received from the first slave BMS 201, a data amount of second data 20 received from the second slave BMS 202, a data amount of third data 30 received from the third slave BMS 203 and a data amount of fourth data 40 received from the fourth slave BMS 204. For example, the data amount may be a size of data (e.g., byte). In addition, the master BMS 100 may calculate the data reception rate indicating a ratio of data received by the master BMS 100 for each slave BMS 201, 202, 203, 204 based on the calculated total data amount and the data amount of data received from each slave BMS.

Also, preferably, the master BMS 100 according to an embodiment of the present disclosure may communicate with each slave BMS 201, 202, 203, 204 based on the communication identifier. More specifically, the master BMS 100 may determine a communication priority of each of the plurality of slave BMSs 201, 202, 203, 204 based on the communication identifier and communicate with each slave BMS 201, 202, 203, 204 according to the determined communication priority. For example, when the master BMS 100 receives data from the plurality of slave BMSs 201, 202, 203, 204, the master BMS 100 may select a slave BMS, which is to receive data, based on the value of the communication identifier and receive data from the selected slave BMS.

For example, referring to the embodiment of FIGS. 1 and 2, in the case of a region a where data is simultaneously received from the first slave BMS 201 and the fourth slave BMS 204, the master BMS 100 may receive data of the first slave BMS 201 having a smaller communication identifier and does not receive data of the fourth slave BMS 204. Here, the first communication identifier 211 of the first slave BMS 201 may be 0x01, and the fourth communication identifier 214 of the fourth slave BMS 204 may be 0x04. In addition, in the case of a region b where data is simultaneously received from the first slave BMS 201 and the second slave BMS 202, the master BMS 100 may receive data of the first slave BMS 201 having a smaller communication identifier and does not receive data of the second slave BMS 202. Here, the first communication identifier 211 of the first slave BMS 201 may be 0x01, and the second communication identifier 212 of the second slave BMS 202 may be 0x02.

More preferably, the master BMS 100 according to an embodiment of the present disclosure may change the priority determination value assigned to the variable fields of each slave BMS 201, 202, 203, 204. More specifically, the master BMS 100 may change the priority determination value based on the calculated data reception rate.

First, the master BMS 100 may calculate the data reception rate. For example, if the communication identifiers of the first to fourth slave BMSs 201, 202, 203, 204 are 0x01, 0x02, 0x03, and 0x04, respectively, the master BMS 100 may receive the greatest data from the first slave BMS 201 and receive the smallest data from the fourth slave BMS 204. That is, if the communication identifiers of the first to fourth slave BMSs 201, 202, 203, 204 are 0x01, 0x02, 0x03, and 0x04, respectively, the data reception rate of the first slave BMS 201 may be high and the data reception rate of the fourth slave BMS 204 may be low.

In addition, the master BMS 100 may change the priority determination value based on the calculated data reception rate. For example, the master BMS 100 may change the priority determination value of the first slave BMS 201 having the highest data reception rate. For example, the master BMS 100 may change the communication identifier of the first slave BMS 201 from 0x01 to 0x11, without changing the communication identifiers of the second to fourth slave BMSs 202, 203, 204.

More preferably, the master BMS 100 according to an embodiment of the present disclosure may calculate an average value of the data reception rates of the plurality of slave BMSs 201, 202, 203, 204. For example, if the data reception rate for the first slave BMS 201 is 100%, the data reception rate for the second slave BMS 202 is 90%, the data reception rate for the third slave BMS 203 is 70% and the data reception rate for the fourth slave BMS 204 is 10%, the master BMS 100 may calculate the average value of the data reception rates as 67.5%.

In addition, the master BMS 100 may change the priority determination value of at least one of the plurality of slave BMSs 201, 202, 203, 204 so that the priority of a slave BMS having a smaller data reception rate than the average value is increased based on the average value of the data reception rates. For example, the master BMS 100 may change the priority determination value of the fourth slave BMS 204 whose data reception rate is smaller than 67.5%, which is the average value of the data reception rates. For example, the master BMS 100 may change the priority determination value of the fourth slave BMS 204 so that the size of the communication identifier of the fourth slave BMS 204 is decreased.

Through this configuration, the system for communication between BMSs according to an embodiment of the present disclosure may effectively manage the data reception rates by changing the priority determination value of a slave BMS having the highest or lowest data reception rate.

Also, preferably, the master BMS 100 according to an embodiment of the present disclosure may change the priority determination value of at least one of the plurality of slave BMSs 201, 202, 203, 204 such that the priority of a slave BMS whose data reception rate is greater than the average value is lowered based on the average value of the data reception rate. For example, the master BMS 100 may change the priority determination values of the first slave BMS 201, the second slave BMS 202 and the third slave BMS 203 whose data reception rates are higher than 67.5%, which is the average value of the data reception rates. For example, the master BMS 100 change the priority determination values of the first slave BMS 201, the second slave BMS 202 and the third slave BMS 203 so that the sizes of the communication identifiers of the first slave BMS 201, the second slave BMS 202 and the third slave BMS 203 are increased.

More preferably, the master BMS 100 according to an embodiment of the present disclosure may change the priority determination value such that the communication identifier value is decreased as the data reception rate is smaller. For example, if the data reception rate for the first slave BMS 201 is 100%, the data reception rate for the second slave BMS 202 is 90%, the data reception rate for the third slave BMS 203 is 70% and the data reception rate for the fourth slave BMS 204 is 10%, the master BMS 100 may change the priority determination value of at least one of the first to fourth slave BMSs 201, 202, 203, 204 so that the communication identifier decreases in the order of the first slave BMS 201, the second slave BMS 202, the third slave BMS 203 and the fourth slave BMS 204.

More preferably, the master BMS 100 according to an embodiment of the present disclosure may change the priority determination value so that the communication identifier value is increased as the data reception rate is greater. For example, if the data reception rate for the first slave BMS 201 is 100%, the data reception rate for the second slave BMS 202 is 90%, the data reception rate for the third slave BMS 203 is 70% and the data reception rate for the fourth slave BMS 204 is 10%, the master BMS 100 may change the priority determination value of at least one of the first to fourth slave BMSs 201, 202, 203, 204 so that the communication identifier increases in the order of the fourth slave BMS 204, the third slave BMS 203, the second slave BMS 202 and the first slave BMS 201.

Through this configuration, the system for communication between BMSs according to an embodiment of the present disclosure may maintain the data reception rates evenly by changing the priority determination values of the plurality of slave BMSs, thereby preventing a sudden loss of data for a specific slave BMS. That is, the system for communication between BMSs may prevent accumulation of data losses for a specific slave BMS.

Also, preferably, the master BMS 100 according to an embodiment of the present disclosure may allocate communication identifiers to the plurality of slave BMSs 201, 202, 203, 204, respectively. More specifically, the master BMS 100 may allocate communication identifiers to the plurality of slave BMSs 201, 202, 203, 204 so that the variable field is disposed at a foremost region of the communication identifier. For example, as shown in FIG. 3, the master BMS 100 may dispose the variable field at the foremost region of the communication identifier such that a first digit or letter in the region of the communication identifier becomes the priority determination value. Through this configuration, the system for communication between BMSs according to an embodiment of the present disclosure has an advantage of easily changing orders of the communication priorities. Preferably, the priority may be set lower as the communication identifier is greater.

The system for communication between BMSs according to the present disclosure may be a component of a battery pack including a plurality of secondary batteries. Here, the battery pack may include at least one secondary battery, the system for communication between BMSs, electrical equipment (having a BMS, a relay, a fuse, etc.), and a case. The plurality of battery cells may be classified into the N number of cell groups, and the cell groups may be respectively coupled with the N number of BMSs in a one-to-one relationship. It is obvious that the battery cells in each cell group may be connected in series and/or in parallel.

In addition, the system for communication between BMSs according to the present disclosure may be a component of a battery-powered system including a battery and a load powered therefrom. Examples of the battery-powered systems include a vehicle, an electric vehicle (EV), a hybrid electric vehicle (HEV), an electric bicycle (E-Bike), a power tool, an energy storage system, an uninterruptible power source (UPS), a portable computer, a portable telephone, a portable audio device, a portable video device, and the like. Also, examples of the load include a motor for providing a rotational force with the power supplied by the battery, or a power conversion circuit for converting the power supplied by the battery into a power required by various circuit components.

Figure 4:
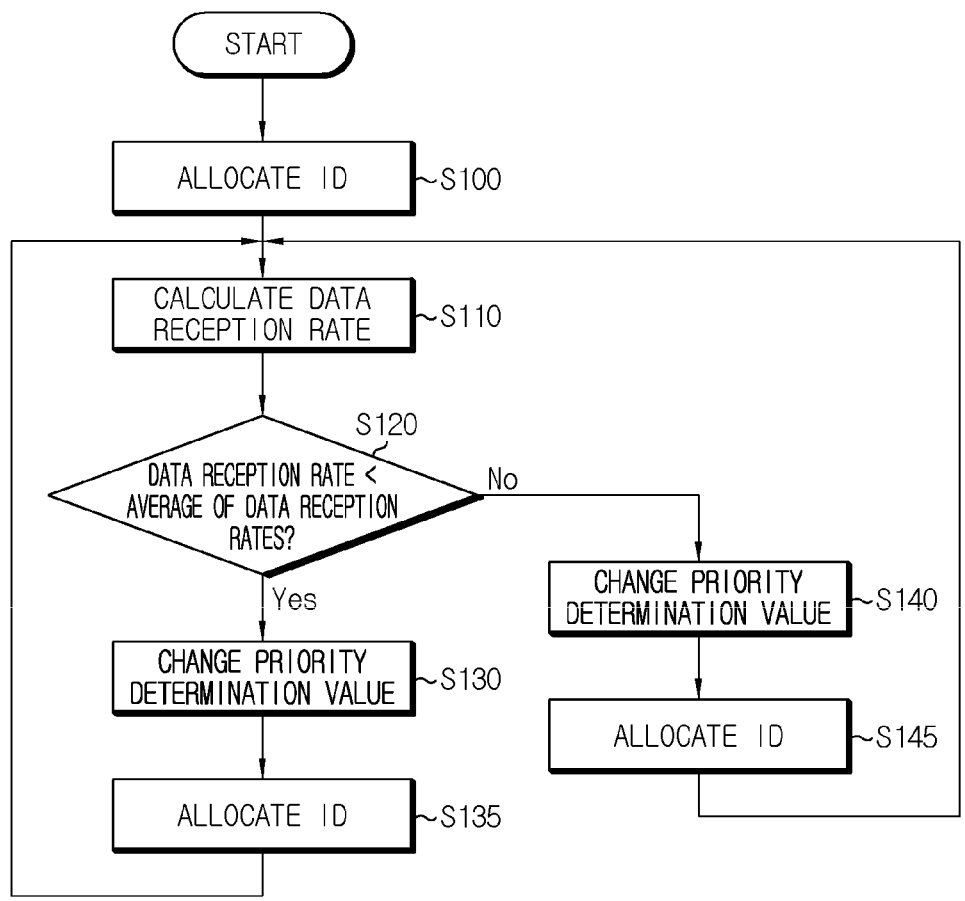
FIG. 4 is a diagram schematically showing a method for communication between BMSs according to an embodiment of the present disclosure.

FIG. 4 is a diagram schematically showing a method for communication between BMSs according to an embodiment of the present disclosure.

Referring to FIG. 4, the method for communication between BMSs according to an embodiment of the present disclosure will be described. Here, the method for communication between BMSs according to an embodiment of the present disclosure may be performed by the apparatus for communication between BMSs.

In the step S100, the master BMS 100 may allocate a communication identifier having a variable field to each of the plurality of slave BMSs 201, 202, 203, 204.

Subsequently, in the step S110, the master BMS 100 may calculate a data reception rate for each slave BMS 201, 202, 203, 204.

Subsequently, in the step S120, the master BMS 100 may calculate an average value of the data reception rates and determine whether the data reception rate of each slave BMS 201, 202, 203, 204 is smaller than the average value of the data reception rates. If the result of the step S120 is "YES", the method proceeds to the step S130. Otherwise, the method proceeds to the step S140.

Subsequently, in the step S130, the master BMS 100 may change the priority determination value of a slave BMS whose data reception rate is lower than the average value of the data reception rates. For example, the master BMS 100 may change the priority determination value so that the communication identifier of the slave BMS whose data reception rate is smaller than the average value is decreased. That is, the master BMS 100 may set the slave BMS whose data reception rate is lower than the average value to have a higher priority, by setting the communication identifier smaller.

Subsequently, in the step S135, the master BMS 100 may allocate the communication identifier having the changed priority determination value to a target slave BMS. Here, the target slave BMS may be a slave BMS whose priority determination value is changed. For example, the number of target slave BMSs may be one or plural. Subsequently, the method may return to the step S110.

For example, it is assumed that one of 0 and 1 may be allocated to the variable field as the priority determination value. In addition, if the communication identifier of the second slave BMS 202 is 0x02 and the data reception rate of the second slave BMS 202 is smaller than the average value, since it is not possible for the master BMS 100 to further lower the value of the communication identifier by changing the priority determination value of the second slave BMS 202, the value of the communication identifier of the second slave BMS 202 may not be changed. In addition, the master BMS 100 may change the communication identifier of a slave BMS whose data reception rate is greater than the average value, thereby resultantly setting the second slave BMS 202 to have a higher priority. That is, the master BMS 100 may determine whether the communication identifiers of the plurality of slave BMSs 201, 202, 203, 204 are changeable, and change the communication identifier of each of the plurality of slave BMSs 201, 202, 203, 204 in response to the determined result.

In the step S140, the master BMS 100 may change the priority determination value of a slave BMS whose data reception rate is greater than the average value of the data reception rates. For example, the master BMS 100 may change the priority determination value so that the communication identifier of the slave BMS having a greater data reception rate is increased. That is, the master BMS 100 may set the slave BMS whose data reception rate is greater than the average value to have a lower priority, by setting the communication identifier to a greater value.

Subsequently, in the step S145, the master BMS 100 may allocate the communication identifier having the changed priority determination value to the target slave BMS. Subsequently, the method may return to the step S110.

Also, when the control logic is implemented in software, the processor may be implemented as a set of program modules. At this time, the program modules may be stored in a memory device and executed by a processor.

In addition, there is no particular limitation on the types of various control logics of the processor, as long as one or more control logics are combined and the combined control logic is written in a computer-readable code system so that the computer-readable access is possible. As one example, the recording medium includes at least one selected from the group consisting of a ROM, a RAM, a register, a CD-ROM, a magnetic tape, a hard disk, a floppy disk and an optical data recording device. In addition, the code system may be stored and executed in a distributed manner on computers connected through a network. Moreover, functional programs, code and segments for implementing the combined control logics may be easily inferred by programmers in the technical field to which the present disclosure belongs.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: master BMS
201: first slave BMS
202: second slave BMS
203: third slave BMS
204: fourth slave BMS
211: first communication identifier
212: second communication identifier
213: third communication identifier
214: fourth communication identifier
221: first variable field
222: second variable field
223: third variable field
224: fourth variable field
50: parallel communication network

What is claimed is:

1. A system for communication between battery management systems (BMSs) of a battery pack that includes a plurality of BMSs connected to a parallel communication network, the system comprising: a plurality of slave BMSs allocated with different communication identifiers, each having a variable field; and a master BMS configured to: allocate a communication identifier to each of the plurality of slave BMSs through the parallel communication network, wherein communication identifier is an alphanumeric value, change a priority determination value allocated to the variable field of each slave BMS according to a predetermined condition to change a data reception rate of each slave BMS, and perform communication with the plurality of slave BMSs based on the communication identifier, including in response to data being received simultaneously from multiple slave BMSs among the plurality of slave BMSs, only receive data from a slave BMS having a smallest communication identifier among the multiple slave BMSs.

2. The system for communication between BMSs according to claim 1,
wherein the master BMS is configured to calculate a data reception rate corresponding to each slave BMS based on a total amount of data received from the plurality of slave BMSs and an amount of data received from each slave BMS.

3. The system for communication between BMSs according to claim 2,
wherein the master BMS is configured to change the priority determination value allocated to the variable field of each slave BMS further based on the calculated data reception rate.

4. The system for communication between BMSs according to claim 3,
wherein the master BMS is configured to calculate an average value of the data reception rates of the plurality of slave BMSs and change the priority determination value of one or more slave BMSs among the plurality of slave BMSs whose data reception rate is smaller than the average value, based on the average value.

5. The system for communication between BMSs according to claim 4,
wherein the master BMS is configured to change the priority determination value so that the priority determination value is decreased as the data reception rate is smaller.

6. The system for communication between BMSs according to claim 3, wherein the master BMS is configured to calculate an average value of the data reception rates of the plurality of slave BMSs and change the priority determination value of one or more slave BMSs among the plurality of slave BMSs whose data reception rate is greater than the average value, based on the average value.

7. The system for communication between BMSs according to claim 6,
wherein the master BMS is configured to change the priority determination value so that the priority determination value is increased as the data reception rate is greater.

8. The system for communication between BMSs according to claim 1,
wherein the master BMS is configured to allocate the communication identifier to each of the plurality of slave BMSs so that the variable field is disposed at a foremost region of the communication identifier.

9. The system for communication between BMSs according to claim 1,
wherein the master BMS is configured to determine a communication priority of each of the plurality of slave BMSs based on the communication identifier and communicate with each slave BMS according to the determined communication priority.

10. A battery pack, comprising the system for communication between BMSs according to claim 1.

11. A vehicle, comprising the system for communication between BMSs according to claim 1.

12. A method for communication between battery management systems (BMSs) of a battery pack that includes a plurality of BMSs connected to a parallel communication network, the method comprising:
allocating a communication identifier having a variable field to each of a plurality of slave BMSs through the parallel communication network, wherein communication identifier is an alphanumeric value;
changing a priority determination value allocated to the variable field of each slave BMS according to a predetermined condition to change a data reception rate of each slave BMS; and
performing communication between the plurality of slave BMSs and a master BMS based on the communication identifier, including in response to data being received simultaneously from multiple slave BMSs among the plurality of slave BMSs, only receiving data from a slave BMS having a smallest communication identifier among the multiple slave BMSs.

13. The method for communication between BMSs according to claim 12, further comprising:
calculating, by the master BMS, a data reception rate corresponding to each slave BMS based on a total amount of data received from the plurality of slave BMSs and an amount of data received from each slave BMS.

14. The method for communication between BMSs according to claim 13, wherein the changing the priority determination value allocated to the variable field of each slave BMS is further based on the calculated data reception rate.

15. The method for communication between BMSs according to claim 14, further comprising:
calculating, by the master BMS, an average value of the data reception rates of the plurality of slave BMSs; and
changing, by the master BMS, the priority determination value of one or more slave BMSs among the plurality of slave BMSs whose data reception rate is smaller than the average value, based on the average value.

16. The method for communication between BMSs according to claim 15,
wherein the master BMS changes the priority determination value so that the priority determination value is decreased as the data reception rate is smaller.

17. The method for communication between BMSs according to claim 14, further comprising:
calculating, by the master BMS, an average value of the data reception rates of the plurality of slave BMSs; and
changing, by the master BMS, the priority determination value of one or more slave BMSs among the plurality of slave BMSs whose data reception rate is greater than the average value, based on the average value.

18. The method for communication between BMSs according to claim 17, wherein the master BMS changes the priority determination value so that the priority determination value is increased as the data reception rate is greater.

19. The method for communication between BMSs according to claim 12,
wherein the master BMS allocates the communication identifier to each of the plurality of slave BMSs so that the variable field is disposed at a foremost region of the communication identifier.

20. The method for communication between BMSs according to claim 12, further comprising:
determining, by the master BMS, a communication priority of each of the plurality of slave BMSs based on the communication identifier; and
communicating, by the master BMS, with each slave BMS according to the determined communication priority.

* * * * *